Figure 1:
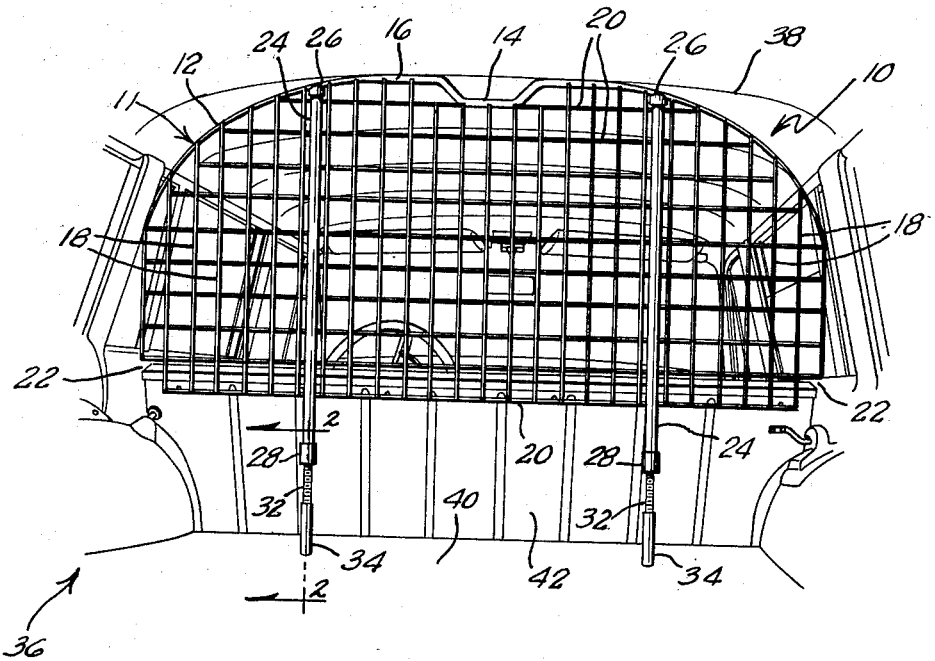

June 22, 1965 W. M. L. JOHNSON 3,190,687
SECTIONALIZING BARRIER FOR AUTOMOBILES
Filed June 20, 1963

INVENTOR.
WALLACE M.L. JOHNSON
BY
Meyers & Peterson
ATTORNEYS 3,190,687
SECTIONALIZING BARRIER FOR AUTOMOBILES
Wallace M. L. Johnson, 861 Clayland St., St. Paul, Minn.
Filed June 20, 1963, Ser. No. 289,228
2 Claims. (Cl. 296—24)

This invention relates generally to a barrier for dividing or separating the interior of an automobile into two sections in order to confine animals or other objects to one portion of the vehicle.

One object of the invention is to provide a barrier that can be installed without actually attaching any portion thereof to the vehicle. More specifically, the invention has for an aim the installation of a barrier of the foregoing character that can be utilized without drilling holes in the vehicle or resorting to any fastening devices that require attachment to the vehicle.

Another feature of the invention is to provide a barrier capable of confining an object to one section of an automobile, including station wagons and compacts (except small foreign cars), and which can be quickly installed or removed in a matter of seconds.

Another object is to provide a barrier having a special utility in the transporting of animals from place to place, because a barrier of the envisaged type allows constant observation of the animal by the driver and in no way blocks the light and air furnished the animal.

Another object of the invention is to provide a barrier that will be firmly anchored during use, thereby resisting dislodgement even when relatively massive objects are thrown thereagainst, such as when the driver is forced to stop suddenly.

Another object of the invention is to provide a barrier that will not rattle.

A further object is to provide a barrier that will be attractive in appearance.

Yet another object of the invention is to provide a barrier of the preceding type that can be fabricated at a relatively low cost, thereby encouraging its widespread use in the transportation of various items.

Figure 2:
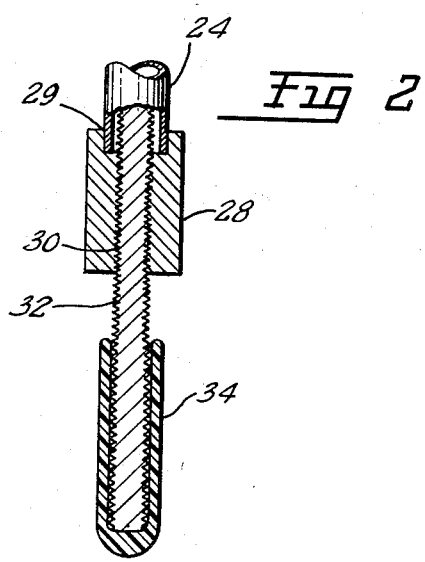

These and other objects and advantages of my invention will more fully appear from the following description, made in connection with the accompanying drawing, wherein like reference characters refer to the same or similar parts throughout the several views and in which:

FIGURE 1 is an elevational view of my barrier when installed in a station wagon, and FIGURE 2 is a sectional detail taken in the direction of line 2—2 of FIGURE 1.

From FIGURE 1, it will be discerned that the barrier exemplifying my invention has been generally denoted by the reference numeral 10. The barrier 10 includes a panel 11 comprised of an upwardly bowed wire 12 which is bent downwardly intermediate its ends so as to form a notch at 14 that will allow the barrier to be placed directly under a dome light when desired. The wire 12 is preferably coated with a plastic covering 16, such as vinyl throughout its central portion to prevent damage to the upholstery thereabove when in use; the plastic covering can be easily applied by merely inverting the panel 11 and dipping it into a liquid bath of the appropriate plastic. Various vertical wires 18 are attached at their upper ends to the curved wire 12, such as by brazing or welding. Secured to the vertical wires 18 are horizontally extending wires 20 which form the latticework or mesh appearance clearly discernible in FIGURE 1. It will be noted, though, that the lowermost wire 20 constituting the lower edge of the panel 11 is somewhat shorter than the wires 20 thereabove and the end wires 18 at either side are also somewhat shorter, thereby providing a notch 22 at each of the lower corners of the panel. The notches 22 obviate any chance of interference, such as where the fenders of a station wagon extend upwardly to a considerable height within the confines of the vehicle and jut inwardly at such a height.

A pair of vertically disposed tubular members are secured to the various horizontal wires 18 throughout their length. Not only do these tubular members 24 lend rigidity to the panel 11, but they serve a very important purpose presently to be made manifest. At the upper ends of the parallel tubular members 24 are caps 26 which close the upper ends and also enhance the appearance thereof, as well as serving as stops for the upper ends of a pair of vertically adjustable legs presently to be referred to. At the lower ends of the tubular members 24 are sleeves 28. Each sleeve 28 is counterbored at its upper end as indicated by the reference numeral 29 for the accommodation of the lower end of the tubular member 24 with which it is associated. While a press-fit is desired between the tubular members 24 and the sleeves 28, the degree of retention can be increased by crimping the metal in the region of the counterbore 29. Also, brazing or welding can be resorted to to assure a fixed attachment.

It will be observed that the tubular members 24 extend somewhat below the lower edge of the panel, that is, the lowermost wire 20. This permits the panel to be made somewhat smaller in height than otherwise would be the case, yet the lowermost wire 20 will never be so high that an animal of usual size could squeeze thereunder. From FIGURE 2, it will be observed that the sleeve 28 in each instance is provided with internal threads 30. These threads 30 permit the adjustment of threaded rods or legs 32 which extend upwardly into the tubular members 24. In practice, the rods 32 will be commensurate in length with the length of the tubular members 24, actually somewhat longer. In other words, each rod 32 may be telescoped almost completely within its particular tubular member 24 by merely turning the rod 32 to cause advancement thereof in an upward direction, the caps 26 serving as stops if need be. Hence, the threaded rods 32 function very effectively as adjustable legs for supporting the panel and also holding the panel in place, as will be better understood hereinafter. The lower ends of the rods 32 are provided with tubular cups 34, which can be of an appropriate plastic material such as vinyl, and which can be easily pressfitted over the lower ends with the result that the threads on the rods retain the cups 34 thereon.

For the purpose of illustrating the use of the barrier 10, a portion of the interior of a station wagon 36 has been pictured in FIGURE 1. The station wagon 36, quite obviously, includes a roof which has been labeled 38. Also, as is conventional in station wagons, a flat floor 40 is included. Still further, the view of the station wagon 36 shows the back side of a seat, this having been designated by the reference numeral 42.

Having presented the foregoing information, the manner in which my barrier 10 is employed should be readily apparent. When it is to be installed, the user merely adjusts the threaded rods 32 to any extended length that is needed in order to force the upwardly bowed wire 12 against the underside of the roof 38 of the vehicle 36. The cups 34 serve as gripping elements and permit ready manipulation of each of the threaded rods 32 so as to cause them to project only the necessary amount. It will be appreciated that the mere twisting of the rods 32, owing to their threaded engagement with the sleeves 28, will exert a considerable pressural action against the floor 40 with a similar reaction being applied to the underside of the roof 38 through the agency of the upper wire 12, cushioned, however, by the plastic covering 16.

Normally, the barrier 10 will be positioned immediately behind the seat 42 and thus if an animal or sizeable object is thrown against the barrier 10, such as when the driver is compelled to stop the vehicle suddenly for a traffic situation, the seat 42 assists in absorbing the thrust. However, it should be understood that the extension of the threaded rods 32 cause the barrier to be tightly wedged between the roof 38 and the floor 40 and will resist dislodgement except under the very heaviest impact loads.

In view of what has herein been stated, it will be recognized that the barrier 10 when installed serves very effectively to separate the interior of a vehicle, such as the station wagon 36 into fore and aft sections, thereby permitting a dog or other animal, as well as miscellaneous items, to be safely transported in the rear section. It will be further perceived that no tools or implements are needed in installing the barrier 10, and that no attachment whatsoever is necessary with respect to the vehicle 36. It will be appreciated, though, that the wire 12 need not engage the underside 38 of the roof throughout its length, for only a small portion thereof need actually contact the underside in order to firmly retain the barrier 10 in an upright position. Likewise, it will be appreciated that the threaded rods 32, owing to their lateral spacing, need not engage a flat surface, such as the floor 40, for they can be abutted against the floor of any automobile, including automobiles with the conventional transmission shaft hump; in such instances, the threaded rods 32 simply straddle such a hump. In general, the barrier 10 has been devised with the thought that it will be usable in all types of vehicles, as hereinbefore mentioned, with the exception of a few small foreign cars.

It will, of course, be understood that various changes may be made in the form, details, arrangements and proportions of the parts without departing from the scope of my invention as set forth in the appended claims.

What is claimed:
1. A barrier for separating the interior of an automobile into fore and aft sections comprising:
 (a) a panel including an upwardly bowed wire constituting the upper edge thereof and additional intersecting horizontal and vertical wires forming the remainder of the panel;
 (b) a pair of tubular members extending downwardly from said upwardly bowed wire to a locus beneath the lowermost of said additional wires;
 (c) a pair of internally threaded sleeves fixedly connected to the lower ends of said tubular members;
 (d) a threaded rod carried by each sleeve and having its upper end projecting into the particular tubular member to which its sleeve is affixed and its lower end projecting downwardly,
 (e) a tubular elongated flexible cup member frictionally retained on the lower threaded end of each rod,
 (f) whereby each rod can be threadedly adjusted to the extent necessary to force at least a portion of said upwardly bowed wire against the underside of the automobile's roof.

2. A barrier in accordance with claim 1 in which:
 (a) said upwardly bowed wire is bent downwardly midway between its ends to avoid interference with the dome light of certain automobiles when said panel is located therebeneath.

References Cited by the Examiner
UNITED STATES PATENTS

| | | | |
|---|---|---|---|
| 2,493,258 | 1/50 | Massare | 296—23 |
| 2,494,980 | 1/50 | Zuckerman | 280—150 |
| 2,982,579 | 5/61 | Greenwald | 296—24 |
| 2,997,331 | 8/61 | Kudner | 296—24 |
| 3,044,800 | 7/62 | Wicker | 296—24 X |

MILTON BUCHLER, *Primary Examiner.*

A. HARRY LEVY, *Examiner.*